(12) United States Patent
Gurin

(10) Patent No.: US 11,120,145 B2
(45) Date of Patent: Sep. 14, 2021

(54) METHOD AND SYSTEM OF ENSURING INTERACTION OF DEVICES OF THE INTERNET OF THINGS (IOT)

(71) Applicant: Oleg Dmitrievich Gurin, Suzdal (RU)

(72) Inventor: Oleg Dmitrievich Gurin, Suzdal (RU)

( * ) Notice: Subject to any disclaimer, the term of this patent is extended or adjusted under 35 U.S.C. 154(b) by 0 days.

(21) Appl. No.: 17/263,169

(22) PCT Filed: Jan. 24, 2019

(86) PCT No.: PCT/RU2019/000040
§ 371 (c)(1),
(2) Date: Jan. 26, 2021

(87) PCT Pub. No.: WO2019/168435
PCT Pub. Date: Sep. 6, 2019

(65) Prior Publication Data
US 2021/0209237 A1 Jul. 8, 2021

(30) Foreign Application Priority Data

Sep. 26, 2018 (RU) .......................... RU2018133842

(51) Int. Cl.
*H04L 29/06* (2006.01)
*G06F 21/60* (2013.01)
(Continued)

(52) U.S. Cl.
CPC ............ *G06F 21/602* (2013.01); *G16Y 30/10* (2020.01); *H04L 9/0861* (2013.01);
(Continued)

(58) Field of Classification Search
CPC ..... G06F 21/602; G06F 8/61; H04L 63/0435; H04L 9/3247; H04L 9/16; H04L 9/0861;
(Continued)

(56) References Cited

U.S. PATENT DOCUMENTS 10,367,794 B2 * 7/2019 Sayers .................. H04L 9/0643
2017/0155703 A1 * 6/2017 Hao ........................ H04L 67/12
(Continued)

FOREIGN PATENT DOCUMENTS

CN 106910376 A 6/2017
CN 107682331 A 2/2018
(Continued)

*Primary Examiner* — Joseph P Hirl
*Assistant Examiner* — Leynna Truvan

(57) ABSTRACT

The present technical solution refers to the area of arrangement of network data exchange schemes among a plurality of devices, particularly, for data exchange among devices of the Internet of things (IoT). The technical result is the increase of protection of the information exchange of data among devices by the method of arrangement of the trusted interaction environment and provision of each participant of the information exchange in the trusted environment with the protected security module in the environment of which all necessary operations are performed for implementation of data exchange with the use of a set of symmetrical access keys. The claimed solution is implemented by means of ensuring the trusted environment of data packets exchange among IoT devices in which each of IoT devices is equipped with the security module containing symmetrical sets of keys used for encryption, signing and check of the transmitted data packets.

24 Claims, 7 Drawing Sheets

(51) Int. Cl.
   *G16Y 30/10*      (2020.01)
   *H04L 9/08*       (2006.01)
   *H04L 9/16*       (2006.01)
   *H04L 9/32*       (2006.01)
   *G06F 8/61*       (2018.01)

(52) U.S. Cl.
   CPC .......... *H04L 9/0891* (2013.01); *H04L 9/0894* (2013.01); *H04L 9/16* (2013.01); *H04L 9/3247* (2013.01); *H04L 63/0435* (2013.01); *G06F 8/61* (2013.01); *H04L 2209/38* (2013.01)

(58) Field of Classification Search
   CPC . H04L 9/0894; H04L 9/0891; H04L 2209/38; G16Y 30/10
   See application file for complete search history.

(56) References Cited

U.S. PATENT DOCUMENTS

| | | | |
|---|---|---|---|
| 2018/0183587 A1 | 6/2018 | Won et al. | |
| 2018/0198604 A1* | 7/2018 | Hayton | H04W 12/10 |
| 2019/0253243 A1* | 8/2019 | Zimmerman | H04L 9/3247 |

FOREIGN PATENT DOCUMENTS

| | | |
|---|---|---|
| RU | 2621182 C1 | 5/2017 |
| WO | 2017167741 A1 | 3/2017 |
| WO | 2017082966 A1 | 5/2017 |
| WO | 2018066362 A1 | 4/2018 |

* cited by examiner

METHOD AND SYSTEM OF ENSURING INTERACTION OF DEVICES OF THE INTERNET OF THINGS (IOT)

PRIOR ART

The present technical solution refers to the area of arrangement of network data exchange schemes among a plurality of devices, particularly, for data exchange among devices of the Internet of things (IoT).

BACKGROUND

Nowadays, IoT solutions are implemented massively in various fields and, as a rule, such solutions are rigidly connected to the program logic of the control device ensuring generation of control commands for controlled elements.

There are also IoT implementations in the sphere of blockchain protocols for arrangement of data exchange and trusted interaction among participants of the exchange in the unified distributed ledger. For example, such a solution is known from application US 20180183587 (VMware Inc., 28.06.2018). Complication of the given approach for a wide range of devices is insufficient protection during data exchange of IoT devices in case of the use of conventional approaches of implementation of the blockchain infrastructure on the basis of the program logic.

For partial levelling of current problems, it is suggested to use protected hardware media of data exchange, for example, eSIM or UICC cards (chips, smart cards) which will perform necessary operations of check/confirmation of data packets which IoT devices are exchanging in the process of their operation. For example, the reference to possibility of such solutions is given in applications WO 2018066362 (NEC CORP, 12.04.2018), WO 2017082966 (Intel IP Corp., 18.05.2017).

However, currently existing proposals on ensuring exchange and interaction among IoT devices do not offer transparent, from the point of view of protection, information data exchange of the technical solution which would also ensure decentralized and universal control of devices in the unified environment of interaction with the proper protection level and trusted data exchange within such an information environment.

SUMMARY

The current invention is aimed at creation of a new, safe and universal method and the system for control of a plurality of IoT devices.

The technical result is the increase of protection of the information exchange of data among devices by the method of arrangement of the trusted interaction environment and provision of each participant of the information exchange in the trusted environment with the protected security module in the environment of which all necessary operations are performed for implementation of data exchange with the use of a set of symmetrical access keys.

The preferred embodiment of the claimed solution presents the method of ensuring interaction of IoT devices including exchange of information among a plurality of IoT devices and a cloud platform comprising the following steps:

Installing at least one security module at each of the IoT devices and the cloud platform ensuring trusted program execution, safe data storage, as well as performance of cryptographic operations for data exchange among the devices and/or the cloud platform;

registering a list of trusted IoT devices and their relevant IDs in the cloud platform for ensuring information exchange, with recording a set of encryption keys into the said security module of the trusted IoT devices for performance of the specified cryptographic operations, with these keys being symmetrical and one-time and a copy of the key set for each trusted IoT device stored in the security module of the cloud platform and/or trusted IoT devices involved in the data exchange;

ensuring generation of an information packet containing data and ID of the IoT device processed in the security module of the IoT device with the use of the encryption key, transmission of the said packet to the IoT device or the cloud platform receiving this packet, processing of the said packet with the use of the specified copy of the encryption key during data exchange among trusted IoT devices or at least one IoT device and the cloud platform, with the said procedure being performed in the environment of the security module of the cloud platform or the IoT device receiving the data packet;

receiving processed data from the said information packet in the security module of the receiving IoT device or the security module of the cloud platform;

performing registration of the retired encryption keys with the use of security modules of the trusted IoT devices or at least one security module of the IoT device and a security module of the cloud platform, and assigning a new encryption key from the said set of keys of the IoT device for confirmation of the next information packet.

In one of particular embodiments of the method, IoT devices include controlled and/or controlling devices.

In other particular embodiment of the method, the security module is a hardware, hardware-software or software module or their combinations.

In other particular embodiment of the method, encryption keys are generated in the security module of the IoT device from the numerical sequence.

In other particular embodiment of the method, each new key of the set is generated as a next set of numbers from the numerical sequence.

In other particular embodiment of the method, the hardware security module is UICC, eUICC, iUICC or their combinations.

In other particular embodiment of the method, ID of IoT devices is the IMEI number, the MAC-address, the IP-address, the Bluetooth address or their combinations.

In other particular embodiment of the method, the procedure of connection and exchange of data of IoT devices among them and the cloud platform is performed with the use of the blockchain protocol.

In other particular embodiment of the method, the protocol is Hyperledger Fabric.

In other particular embodiment of the method, the data exchange among IoT devices or among IoT devices and the cloud platform is performed with the use of smart-contracts.

In other particular embodiment of the method, smart-contracts are executed in security modules of trusted IoT devices and the cloud platform performing processing of the information packet.

In other particular embodiment of the method, during generation of the information packet, its creation time mark is additionally recorded.

In other particular embodiment of the method, processing of the information packet includes operations of encryption/decryption.

In other particular embodiment of the method, processing of the information packet includes the check of the packet integrity control.

In other particular embodiment of the method, processing of the information packet includes generation of the digital signature verifying the transmission source and packet stability.

In other particular embodiment of the method, the security module is adapted to supplement and/or update the set of encryption keys.

The other preferred embodiment of the claimed solution presents the system ensuring interaction of devices of the Internet of things (IoT) including a plurality of IoT devices and the cloud platform in which
each of the IoT devices and the cloud platform contain at least a security module ensuring trusted program execution, safe data storage, as well as performance of cryptographic operations for data exchange among the devices and/or the cloud platform;
the cloud platform is adapted to register a list of trusted IoT devices and their relevant IDs for ensuring information exchange, with recording a set of encryption keys into the said security module of the trusted IoT devices for performance of the specified cryptographic operations, with these keys being symmetrical and one-time and a copy of the key set for each trusted IoT device stored in the security module of the cloud platform and/or trusted IoT devices involved in the data exchange;
with the security modules of the data exchange initiating device and the receiving end ensuring data exchange among trusted IoT devices or at least one IoT device and the cloud platform;
generation of the information packet containing data and ID of the initiating IoT device;
processing of the said information packet with the use of the encryption key;
transmission of the said packet to the packet receiving IoT device or the cloud platform;
processing of the said packet with the use of the said copy of the encryption key, with the specified procedure performed in the environment of the security module of the cloud platform or the data packet receiving IoT device;
receiving processed data from the said information packet in the security module of the receiving IoT device or the security module of the cloud platform; and
registering retired encryption keys with assigning a new encryption key from the said set of keys of the IoT device for confirmation of the next information packet.

In one of particular embodiments of the system, the data exchange among IoT devices and the cloud platform is performed as per the protocol of wireless and/or wired data transmission.

In other particular embodiment of the system, the protocol is selected from the group: WLAN, WAN, Wi-Fi, GSM, GPRS, LTE, 5G, ZigBee, LPWAN, LoRaWan, Bluetooth, BLE, TCP/IP, ModBus, NB-IoT, Z-Wave, Sigfox, Ethernet.

In other particular embodiment, the security module is adapted to update and/or supplement the set of encryption keys.

In other particular embodiment, the data exchange among IoT devices and the cloud platform is performed with the use of the blockchain protocol.

In other particular embodiment, the data exchange among IoT devices or among IoT devices and the cloud platform is performed with the use of smart-contracts.

In this case, encryption keys are non-recoverable from the security module.

DETAILED DESCRIPTION OF THE INVENTION

Figure 1:
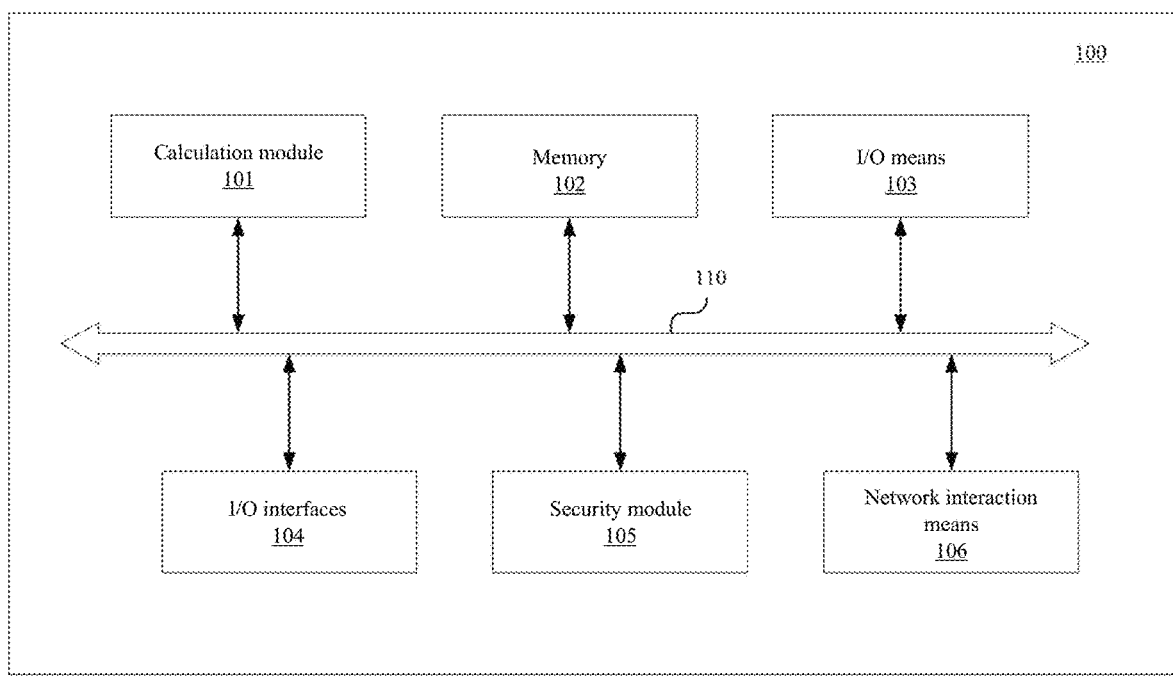
FIG. 1 shows a general view of the IoT device.

FIG. 1 presents the general view of an example of the IoT device (100) applied within the frames of implementation of the claimed solution. The present technical solution is implemented by means of provision of devices of the Internet of things, or IoT devices, (100) participating in the information exchange with a special security module (105) which ensures protected performance of necessary procedures on data exchange among participants of the IoT infrastructure.

In general terms, the device (100) contains a calculation module (101), one or several memory means (102) or devices of operating or permanent data storage, information input/output means (103), information input/output interfaces (104), a security module (105) and a network interaction means (106). Elements of the device (100) may, particularly, connect to each other through a data bus (110) or connect by means of other known principles on the basis of specific implementation and hardware embodiment of the device (100). In this case, it should be clear to specialists that a set of elements of the device (100) may be different in its particular embodiments.

The calculation module (101) may be presented by one or several processors, a microcontroller, an FPGA with an integrated calculation means, a microchip or other means ensuring processing of data for implementation of operations and/or commands performed by the device (100).

Memory (102) comprises one or several data storage means, for example, random access memory (RAM) and/or read-only memory (ROM). Read-only memory is selected from such a range of devices as: a hard disk drive (HDD), a solid-state drive (SSD), flash memory (EEPROM, NAND, SD/TF/Memory Stick-Card, etc.), optical drives (CD/DVD/MD/Blue-Ray disks), etc. Memory (102) performs operating and/or permanent memorization of necessary instructions and data to ensure device (100) functioning.

I/O facilities (103) are selected from a range of means which are appropriate to a certain embodiment of the device (100), for example, the following means may be used for input/output: a display (including a touch screen), a keyboard, a manipulator of a mouse, trackball, touch pad, light pen, touch tablet, projector, speakers, light indicator type, etc.

ADC/DAC may also be I/O facilities (103) for particular examples of IoT devices (100) embodiment.

I/O interfaces (104) may be selected from the following implementation means depending on the type of IoT device (100), for example, PCI, VGA, AGP, DVI, SATA, USB (Type-C, micro-, Mini-), PS/2, RJ45, LPT, FireWire, RS232, Lightning, COM, HDMI, Display Port, Audio Jack, GPIO, ADC/DAC, etc.

A security module (105) is an element of the device (100) ensuring secure storage of encryption keys, various data, for example, necessary for information exchange operations, chip firmware upgrade, etc., execution of cryptooperations, as well as processing and generation of information packets for IoT devices (100) interaction. Detailed description of module (105) operation will be given later.

Network interaction means (106) is one or several devices designed to ensure data receiving and transmitting via a calculation network, for example, the one ensuring information transmission through WLAN, WAN, Wi-Fi, GSM, GPRS, LTE, 5G, ZigBee, LPWAN, LoRaWan, Bluetooth, BLE, TCP/IP, ModBus, NB-IoT, Z-Wave, Sigfox, Ethernet and other protocols. Transmission of information with the use of the device (106) may be performed via both wireless and wired information channels or in a combination of known methods of data exchange.

IoT devices (100) may be selected from a wide range of known solutions involved in the process of information exchange, for example, such devices may be: detectors, actuators, sensors, a smartphone, a tablet, a TV-set, a game console, a computer, a laptop, a terminal, a mainframe, various types of measuring means (thermometers, pressure gauges, calculators, etc), etc. It is obvious that the specified range of devices is only an example of use within the present technical solution and is not limited to other devices which may be equipped with necessary hardware-software logic for interaction in the IoT environment.

As mentioned above, in a particular embodiment of the IoT device (100), the principle of its architecture may exclude the data bus (110). In such an example of device (100) embodiment, its operation logic may be implemented, for example, with the use of a single chip which contains a necessary set of functions.

Figure 2:
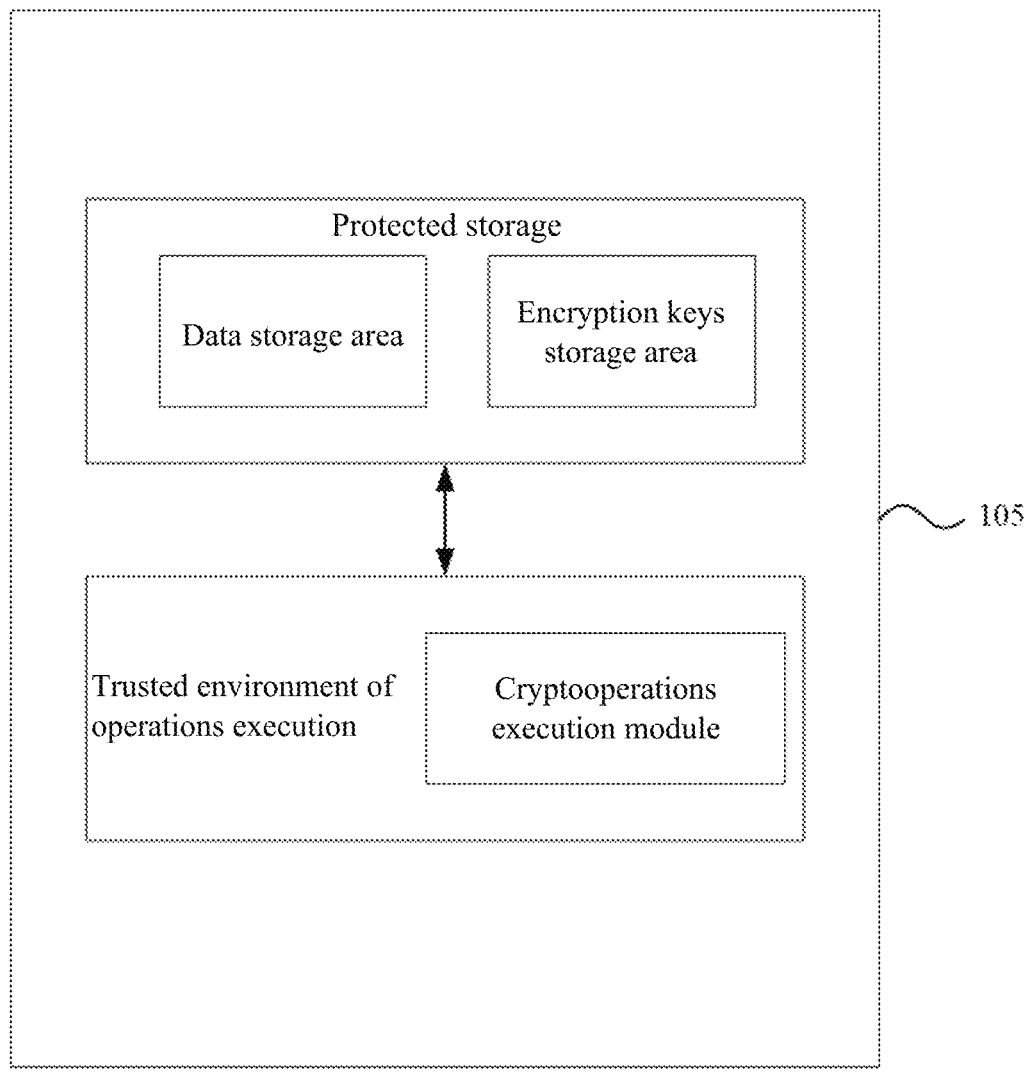
FIG. 2 shows the main components of the security module.

FIG. 2 shows the general concept of implementation of the security module (105). The security module (105) may be implemented as a software, hardware-software or hardware solution which is installed on the IoT device (100). Module (105) ensures storage of encryption keys necessary for generation of information packets for data exchange in the IoT devices interaction environment, provision of the trusted protected environment of data processing and execution of necessary cryptographic operations for data exchange among devices (100).

The security module (105) contains two types of storage, with one being for encryption keys, and the second one being for different kinds of information, for example, data necessary for information exchange operations, chip firmware upgrade, smart-contracts parameters, etc.

The security module (105) may be represented by the program logic stored in the memory (102) of the device (100) and interacting with the calculation module (101) for implementation of the prescribed functions.

In case of hardware-software or hardware implementation, module (105) may be implemented in the form of such solutions as UICC, eUICC, iUICC, eSIM, etc. Examples of similar solutions are widely known in the prior art, for example, in a document WO 2018007461 (GEMALTO SA, 11.01.2018).

The security module (105) is also designed for storage of a set of encryption keys to ensure the trusted and secure data exchange among IoT devices (100). In the present application documents, the security module (105) should also be understood as a secure element (for example, https://www.justaskgemalto.com/en/what-is-a-secure-element/).)

Figure 3:
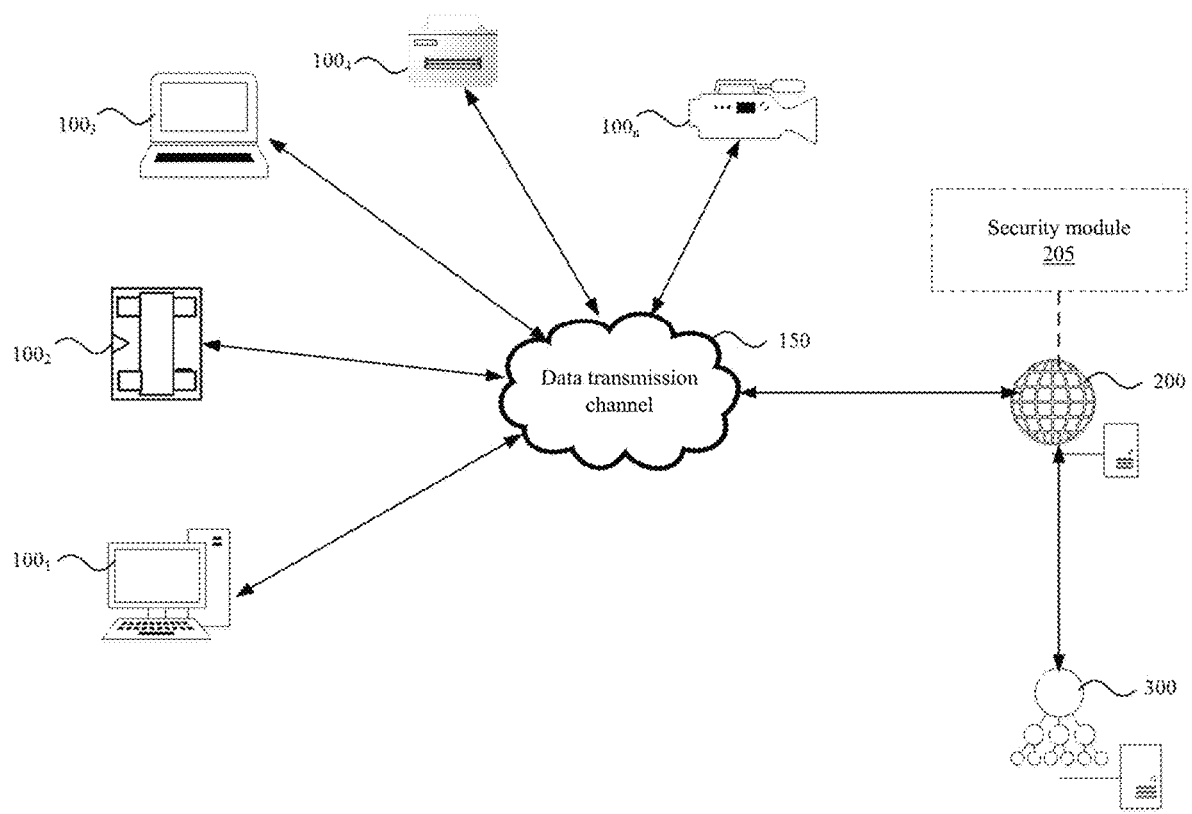
FIG. 3 shows a general view of the IoT devices interaction system.

FIG. 3 shows an example of the general concept of the IoT devices (100) interaction system. Devices ($100_1$)-($100_n$) interact with each other and the IoT infrastructure via the cloud platform (200) with the use of various data transmission channels (150).

When devices ($100i$)-($100_n$) begin to interact in the IoT infrastructure, they perform initial registration in the cloud platform (200). Registration is performed, for example, with the use of the software installed on device (100), with the use of the pre-installed logic in the security module (105) of interaction with the cloud platform (200).

Registration involves transmission of information identifying the IoT device (100) to the cloud platform (200). Such information may be represented, for example, by the device ID which may include but is not limited to: UID, IMEI, SSID, MAC-address, Bluetooth ID, IP-address, PIN/PUK-code, serial number of a chip or other element of device (100), or their combinations, etc. On the basis of the received information, device (100) is put on the list of trusted devices. For each of trusted IoT devices (100), a set of encryption keys is generated with the use of the cloud platform (200), with these keys being recorded in the security module (105) of the IoT device (100).

The cloud platform (200) is a server (a cloud server) or several servers (for example, a cluster) which also contains the security module (205). The security module of the cloud platform (205) is functionally competitive with the architecture of the security module of IoT devices (105). During each registration of the IoT device (100), a set of encryption keys is recorded in the security module (105) of device (100), and a relevant copy of such a set is also recorded in the security module (205) of the cloud platform (200) with reference of the said set to the corresponding identifier of the registered device (100). Encryption keys are symmetrical and non-recoverable from security modules (105) and (205).

A set of keys may also be generated beforehand for devices (100) and be contained in the security module (105). Such a case is applied if devices (100) are designed at the plant level for operation only in the trusted environment ensured by interaction with the cloud platform (200). In this case, the platform (200) contains the relevant copies of sets of keys in the memory of the security module (205) which are referenced in the cloud platform (200) memory to the corresponding identifiers of devices (100).

The presented interaction principle may also contain an additional network element as a trusted entity (300). Such an entity (300) may be a cellular service operator, a certification authority, a platform for access to the group of devices, a provider, etc. The main function of such an entity (300) is ensuring information exchange among IoT devices (100) which are included in the loop of functioning of this entity (300), and ensuring interaction with external sources via the trusted environment of the cloud platform (200). As a rule, with respect to operation of such an entity (300), one may consider operation of the cellular service operator which contains the loop or the environment of operation of a range of IoT devices (100) to which access should be provided for external users, for example, new subscribers of the network of such an operator (300).

Figure 4:
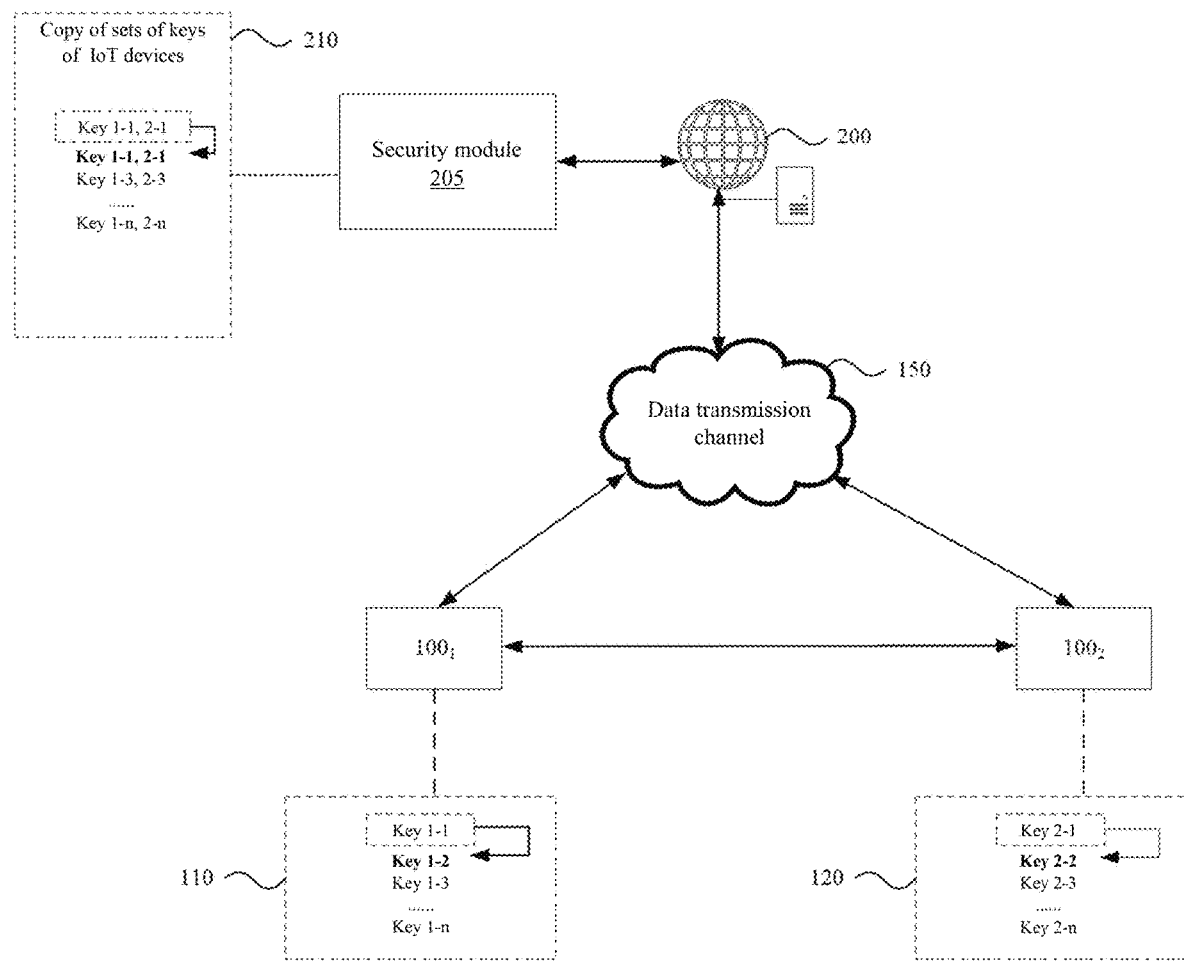
FIG. 4 shows an example of devices interaction with the use of encryption keys.

FIG. 4 shows an example of interaction of IoT devices ($100_1$)-($100_2$) via the cloud platform (200). As mentioned above, each module (105) of IoT devices contains the relative set of encryption keys (110)-(120) to ensure operations on information exchange. A copy of each set of keys (210) is duplicated in the cloud platform (200) in the security module (205).

During data exchange between one of the IoT devices ($110_1$)-($110_2$) and the cloud platform (200) or during interaction of devices among each other ($110_1$)-($110_2$), an information packet is generated which contains at least an identifier (ID) of the IoT device and data for performance of this or that type of interaction (a command, a code, an algorithm, etc.). The type of interaction may be understood, for example, as execution of operations prescribed by the device (opening of the lock, data transmission, temperature calculation, device activation, etc.), provision of data transmission, the program code, etc.

During generation of the information packet, encryption keys are used. As shown on FIG. 4, during generation of the information packet, devices ($110_1$)-($110_2$) (or one of the devices) use one of the encryption keys of the set (110)-(120). The information packet may be enciphered with the use of cryptographic procedures in the security module (105) of the IoT device (100) generating the packet for its further transmission to one or several receiving IoT devices.

The information packet may also be checked by the receiving security module (105) (or (205)) for its integrity. An electronic digital signature may also be used for this procedure for devices ensuring exchange of the information packet. Control of information packets integrity may also be illustrated by such known examples as known algorithms, for example, symmetrical message authentication schemes based on block ciphers, algorithms of check of authentication codes (HMAC), etc.

In case of receiving an information packet from the sender device, the said packet is processed on the receiving device (100) and/or the cloud platform (200) with the use of the security module (105) (and/or (205)). During processing of the information packet, its decryption is performed with the use of the corresponding encryption key of the receiving device (100) or devices ($100_n$) if the information packet was enciphered on the sender device. And in case of successful processing of the information packet on the receiving side, the prescribed logic of information interaction is performed.

When an encryption key of one or two sets (110)-(120) is used, as it is shown on FIG. 4, considering that they are symmetrical and one-time, a mark is made in the security module (105) of each device participating in information exchange and the security module (205) of the cloud system (200) concerning the use of the corresponding key. Then, assignment of the next key of the set (110)-(120) of interacting devices and assignment of its corresponding copy of the set (210) of the security module of the cloud platform (200) are performed. It should be clear for specialists in this field that the order of use of keys may be different and defined by the encryption logic built in security modules (105) of IoT devices (100), and the given example only reflects a particular case of use of encryption keys queuing.

In the particular embodiment, the cloud platform may not participate in the data exchange among devices ($110_1$)-($110_2$). In this case, the use of encryption keys in security modules (105) and their further assignment are performed after exchange of information packets of the specified devices.

The given approach of the use of symmetrical encryption keys has a range of advantages compared with the widely known asymmetrical approach. Particularly, asymmetric encryption is rather resource-intensive, especially in the realm of the IoT infrastructure which may comprise from tens to thousands devices, which is determined by the significant rise of the data packet size for exchange among network members. The given problem is also very significant during implementation of the solution architecture in the blockchain environment which influences the dynamic increase of computational complexity during confirmation of transactions. Asymmetric encryption also has instability to quantum computers, for example, the Shor's algorithm for RSA.

A set of encryption keys in the security module (105) of IoT devices (100) and in the security module of the cloud platform (205) may be dynamically updated in case of its depletion or necessity of updating the set of keys. The given process may be a part of the program logic stored in the cloud platform (200), or in case of involvement of an additional trusted entity (300). In case of interaction through the trusted entity (300), the latter may contain the installed logic concerning update or supplement of the set of encryption keys in IoT devices (100), for examples, during connection of new subscribers into the trusted loop of information exchange. In such an example, the trusted entity (300) may act as a cellular service operator or a provider of another type of services with possibility of provision of a set of encryption keys for arrangement of IoT devices (100) interaction.

Figure 5:
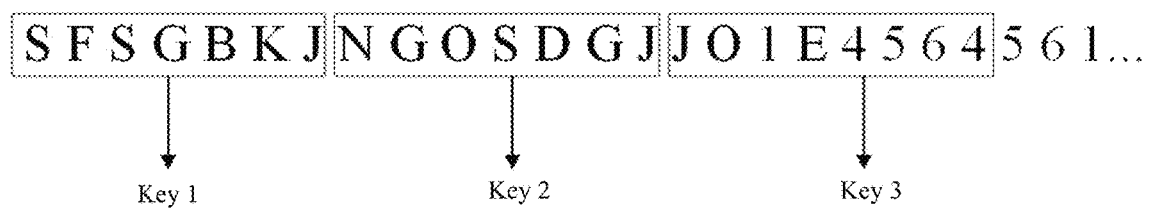
FIG. 5 shows an example of encryption key generation.

FIG. 5 shows an example of encryption keys generation. A set of keys may be generated from numerical sequence or alphanumeric sequence. The principle of encryption keys generation may be different. As an example, but not a limitation, one of the principles of keys generation may be the method of selection of the next set of symbols following the used sequence. It means that, after application of a set for generation of Key 1, the following parts of the common sequence will be used for generation of the following keys. The number of symbols for key generation may be different and be defined by the logic of the key generation algorithm.

The claimed technical solution may also be implemented with the use of the blockchain technology. In this case, the generated information packets are recorded in the common distributed ledger which may be stored both in IoT devices (100) and in one or several cloud platforms (200). Encrypted information packets are trusted blocks for performance of transactions.

The security module of IoT devices (105) may also contain the logic for implementation of the digital wallet (or a cryptocurrency wallet) to ensure blockchain transactions. Transactions may be understood as any interaction within the trusted environment of IoT devices (100), particularly, access to the device, data exchange, sending data from the device, provision of a service, etc.

Figure 6:
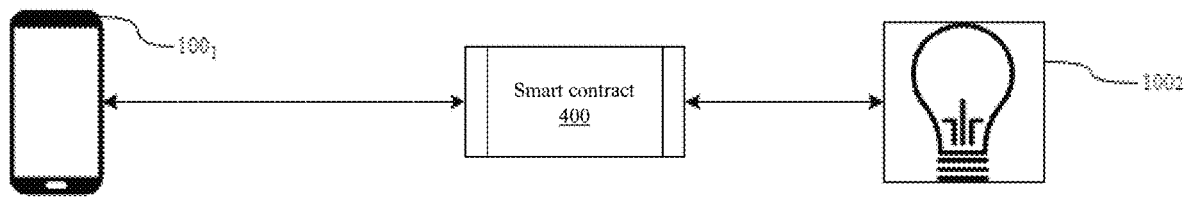
FIG. 6-FIG. 7 show an example of operation of the claimed solution with the use of smart-contracts.
Figure 7:
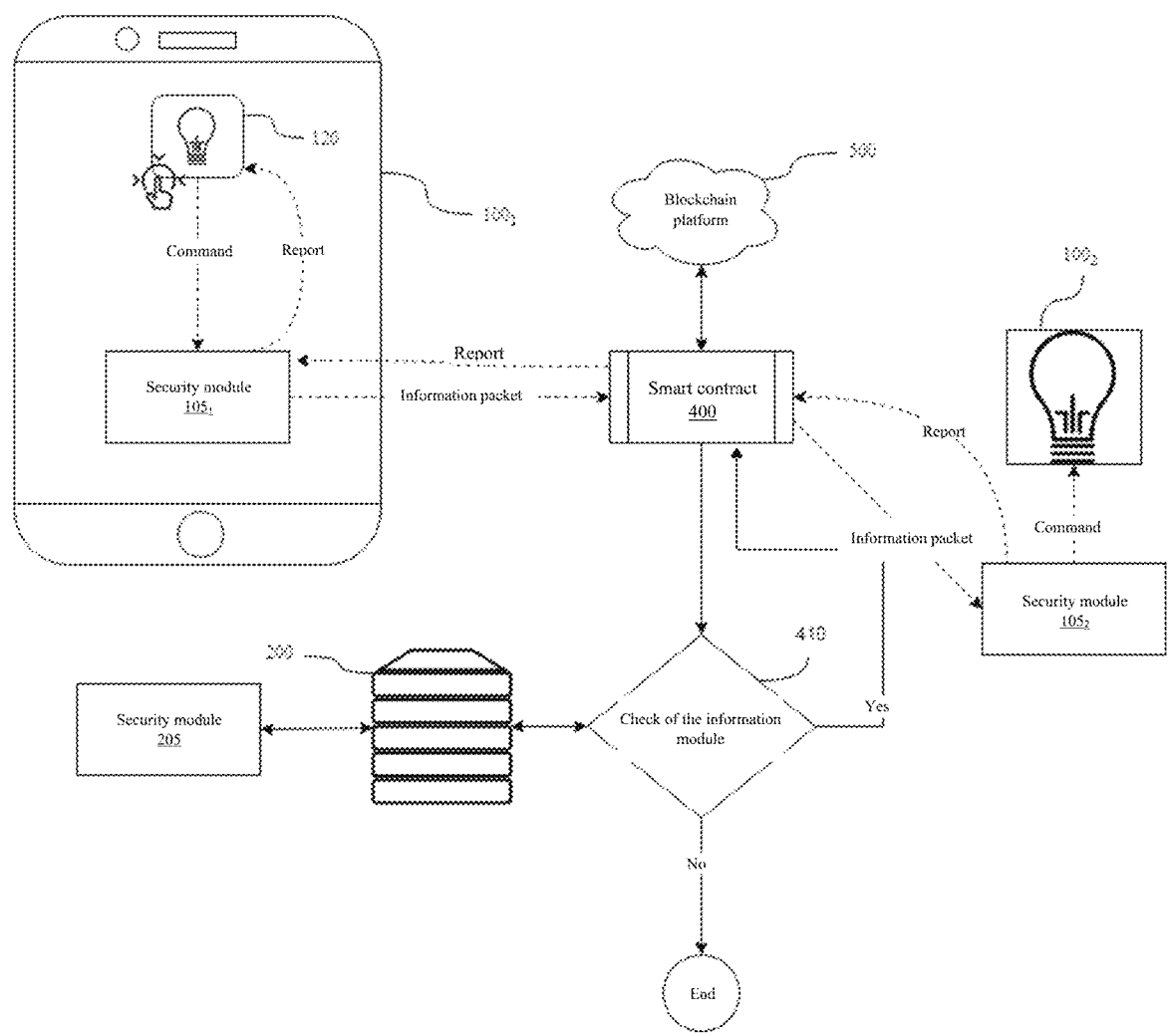

FIG. 6 to FIG. 7 show the process of information interaction of IoT devices (100) by means of implementation on the basis of smart-contracts (SC) (400). For the given interaction, it is reasonable to use the blockchain protocol which will not have significant computational load on the network; an example of such a protocol is Hyperledger Fabric developed by the IBM™ company. Execution of smart-contracts (SC) is performed with the use of generated information packets in security modules ($105_1$)-($105_2$) of IoT devices ($100_1$)-($100_2$) interacting within the blockchain platform (500).

As a rule, the SC (400) is understood as a distributed application executed on the blockchain platform (500) The SC (400) is designed to perform any predetermined actions (or a single action) if certain conditions occur for its implementation, for example, performance of one or several functions which are predetermined with the SC (400) condition by an IoT device (100). Thus, SC (400) security (in relation to reliability and unambiguity of algorithm execution) depends largely on accuracy of data coming to SC (400), as well as accuracy of commands sent from SC (400) to devices.

The SC (400) is suitable for mutual integration of IoT devices (100₁)-(100₂). For example, the simplest scenario is given in FIG. 7: in case of pushing a virtual button (120), a lamp (100₂) should light up on the smartphone screen (100₁). The second pressing should lead to lamp going out. A condition is pressing the button (120), an action (a command) is changing the lamp state. In terms of security, it is necessary that the lamp (100₂) reacts only on pressing the button (120) on no other device but the trusted controlling device (smartphone) (100₁). When the button (120) is pressed, the information packet is generated on the smartphone screen (100₁), signed in the security module (105₁) of the smartphone (100₁) with the use of encryption keys and sent to the cloud platform (200). Encryption is not used in the given example, as confidentiality is not important in this case. With the use of the platform (200), conditions of SC (400) execution are confirmed for transmission of the packet to the controlled IoT device—the lamp (100₂).

On the platform (200), the information packet from the smartphone (100₁) comes to SC (400), and then it is necessary to verify which device is the sender of the packet and assure that the packet has not been changed during delivery, i.e. that the packet has been generated be the trusted device and sent to the trusted device. Two cases of the architecture are possible here: 1) each smart-contract (400) has its security module which is connected to security modules of devices (105₁)-(105₂), involved in operation of SC (400); 2) the platform (200) has the security module (205) which is common for all SC on the given platform (being logically single, it may be a plurality of spatially distributed entities).

The SC (400) addresses to the security module (on the device involved in the process of information exchange or on the cloud platform (200)). In case of the positive response, the SC (400) receives this packet for execution of the algorithm preprogrammed in the SC (400), otherwise, the packet is rejected or sent to the inlet of the security subsystem for investigation. Let's consider a case when the check of packet integrity was successful as an example.

In this case, the SC (400) generates an information packet for changing the lamp (100₂) state which comes to the security module of the SC (400) or the platform (205) for signing, or the signed information packet is sent to the lamp (100₂). When coming to the lamp (100₂) through the network module (e.g., Bluetooth or Wi-Fi), the packet comes to the security module (105₂) where signature check is performed. In case of positive check, the security module (105₂) generates the command to the lamp (100₂) chip to change the state, i.e. to execute the command received from the device (100₁).

After changing the lamp (100₂) state, the lamp (100₂) chip generates the report packet with the current state of the lamp (100₂) (for example, switched on/switched off/service is required, etc.). The report packet goes back through the SC (400), the security module of the platform (205) and comes to the inlet of the security module of the smartphone (100₁) or other controlling device.

Let's consider a case with data encryption as an example of implementation. In case when the information packet contains confidential information, its encryption is used. The packet is encrypted, signed and sent to the platform (200) where it comes to the SC (400).

The SC (400) sends the packet to the security module of the platform (205) where it is decrypted and its signature is checked (i.e. the signature of the trusted device which has initiated its transmission), then the SC (400) generates an information packet, encrypts and signs it and sends to the user's smartphone (100₁). On the smartphone (100₁), the packet is decrypted, and the signature contained in the packet is checked, then the current state of the lamp (100₂) is shown on the smartphone (100₁) (for example, the button changes its color).

The other case is also possible: devices (100₁)-(100₂) sends information packets directly to each other, with copies of the information packets sent to the platform (200) where they are processed by the SC (400), the event log is recorded and cases of abnormal operation of the system are fixed.

Interaction of SC (400) in the system may be ensured via a blockchain platform (500) (a blockchain protocol).

Figure 8:
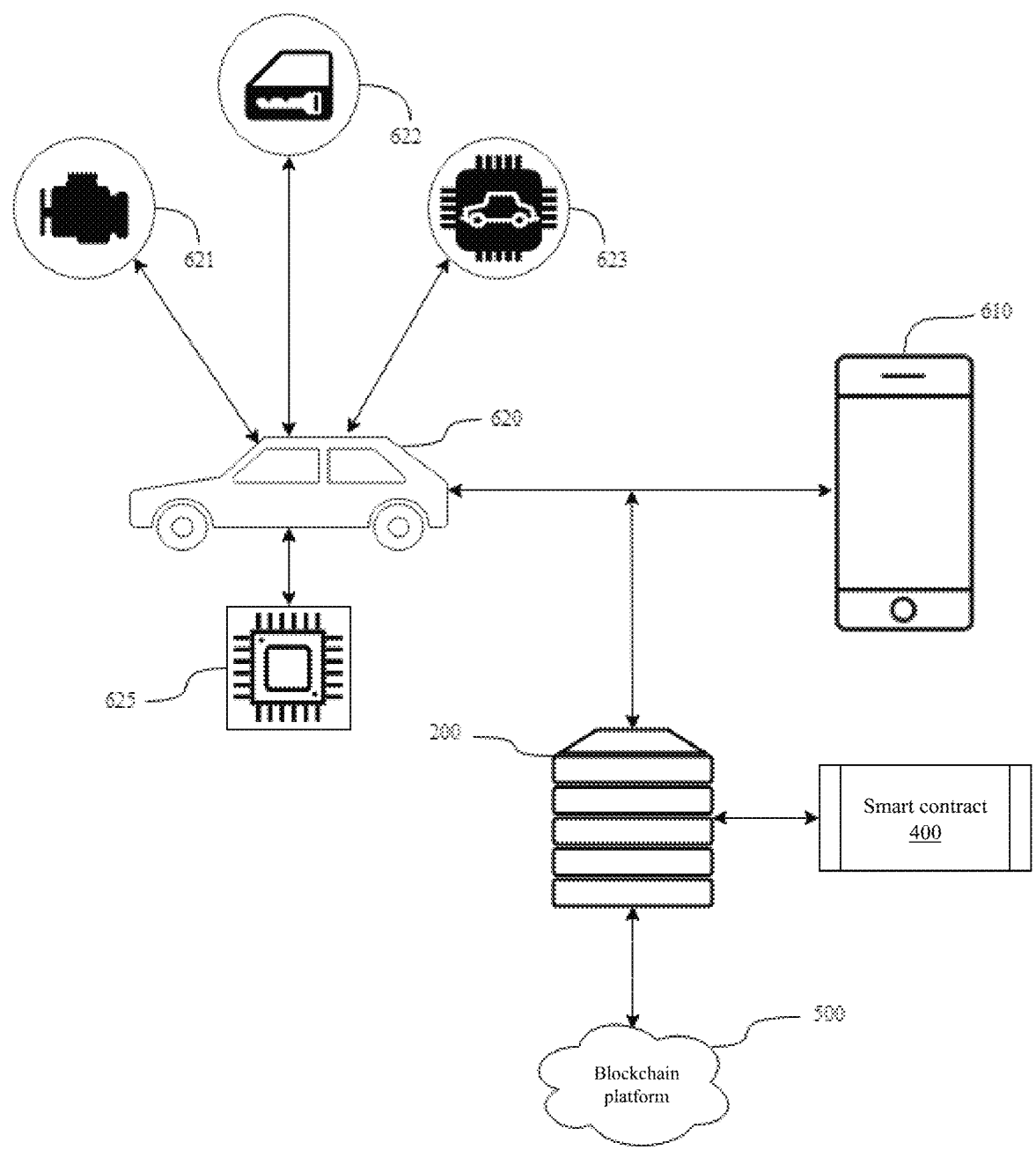
FIG. 8 shows implementation of the solution as illustrated by car sharing.

FIG. 8 shows an example of implementation of the solution as illustrated by car sharing. Access to the service of car (620) sharing is ensured by means of data exchange with the trusted device of the user (610). An automobile (620) contains a range of IoT devices, for example, an engine controller (621), a central lock controller (622), an electronics supervision controller (623) and a single calculation module (625). The module (625) may act as a common unit ensuring information exchange with car's devices (620).

Module (625) may contain the security module which ensures exchange of information packets with the user's smartphone (610) which is connected to the car (610) by means of the cloud platform (200). During registration of the user's device (610) with the use of the platform (200) or additionally through a trusted entity (300), in the system of car sharing services, a corresponding set of encryption keys is recorded in the security module of the device (610) to apply the relative service of car (620) sharing.

During generation of an information packet with the use of the device (610), as stated above, identification information of the device (610) converted on the encryption key is transmitted, with it being further checked for its validity by the security module of the module (625).

In a manner similar to the example on FIG. 7, the SC (400) which will contain the corresponding program logic may also be used for the given example. Car sharing may be arranged with the use of the blockchain platform (500) which will ensure technical interaction of the user with the rented car (620) via the SC (400). In this case, the SC (400) is the software implementation of the legal contract between the user and the owner (the lease holder) of the car. For the sake of security, the SC (400) performs the check of information packets on the security module similarly to the previous example.

In this case, the user's device (610) may contain a cryptocurrency wallet in the security module, with this wallet being used for generation of packets necessary for car (620) sharing.

The given description of the claimed solution identifies only the preferred embodiments and shall not be construed as limiting other, particular embodiments within the scope of the claimed legal protection that shall be familiar to a person skilled in the art.

The invention claimed is:

1. A method of ensuring interaction of devices of the Internet of things (IoT) including exchange of information among a plurality of IoT devices and a cloud platform comprising the following steps:
   installing at least one security module at each of the IoT devices and the cloud platform ensuring trusted program execution, safe data storage, and execution of cryptographic operations for data exchange among the IoT devices and the cloud platform;
   registering a list of trusted IoT devices and their IDs in the cloud platform for ensuring information exchange;

recording a set of encryption keys into the security module of the trusted IoT devices for execution of a specified cryptographic operations, wherein encryption keys are symmetrical and one-time and a copy of the set of the encryption keys for each trusted IoT device stored in the security module of the cloud platform and trusted IoT devices involved in the data exchange;

generating of an information packet containing data and ID of the IoT device, processed in the security module of the IoT device with the use of the encryption key;

transmitting of the information packet to the IoT device or the cloud platform;

receiving and processing of the information packet with the use of a specified copy of the encryption key during data exchange among trusted IoT devices and the cloud platform, wherein processing of the information packet is performed in an environment of the security module of the cloud platform or the security module of the IoT device receiving the information packet;

receiving processed data from the information packet in the security module of the receiving IoT device and the security module of the cloud platform;

performing registration of a retired encryption keys with the use of security modules of the trusted IoT devices or at least one security module of the IoT device and a security module of the cloud platform, and assigning a new encryption key from the set of the encryption keys of the IoT device and the cloud platform for confirmation of a next information packet.

2. The method according to claim 1, wherein IoT devices include controlled and/or controlling devices.

3. The method according to claim 1, wherein security module is a hardware, hardware-software or software module or their combinations.

4. The method according to claim 1, wherein encryption keys are generated in the security module of the IoT device from a numerical sequence.

5. The method according to claim 4, wherein each new key of the set of the encryption keys is generated as a next set of numbers from the numerical sequence.

6. The method according to claim 3, wherein the hardware security module is UICC, eUICC, iUICC or their combinations.

7. The method according to claim 1, wherein ID of IoT devices is selected from the group: IMEI number, MAC-address, IP-address, Bluetooth address or their combinations.

8. The method according to claim 1, wherein a procedure of connection and exchange of data of IoT devices among them and the cloud platform is performed with the use of a blockchain protocol.

9. The method according to claim 8, wherein the blockchain protocol is Hyperledger Fabric.

10. The method according to claim 8, wherein the data exchange among IoT devices or among IoT devices and the cloud platform is performed with the use of smart-contracts.

11. The method according to claim 10, wherein smart-contracts are executed in security modules of trusted IoT devices and the cloud platform performing processing of the information packet.

12. The method according to claim 1, wherein a time mark of the information packet creation is additionally recorded during generation of the information packet.

13. The method according to claim 1, wherein processing of the information packet includes operations of encryption/decryption.

14. The method according to claim 1, wherein processing of the information packet includes a check of the packet integrity control.

15. The method according to claim 1, wherein processing of the information packet includes generation of a digital signature verifying a transmission source and packet stability.

16. The method according to claim 1, wherein the security module is adapted to supplement and/or update the set of encryption keys.

17. The method according to claim 1, wherein encryption keys are non-recoverable from the security module.

18. A system ensuring interaction of devices of the Internet of things (IoT) including a plurality of IoT devices and a cloud platform in which each of the IoT devices and the cloud platform contain at least one security module ensuring trusted program execution, safe data storage, and execution of cryptographic operations for data exchange among the IoT devices and/or the cloud platform;

the cloud platform is adapted to register a list of trusted IoT devices and their relevant IDs for ensuring information exchange, with recording a set of encryption keys into the security module of the trusted IoT devices for execution of specified cryptographic operations, wherein the cryptographic keys are symmetrical and one-time, and a copy of the set of the cryptographic keys for each trusted IoT device is stored in the security module of the cloud platform and trusted IoT devices involved in the data exchange;

with the security modules of the data exchange initiating device and the receiving end ensuring data exchange among trusted IoT devices or at least one IoT device and the cloud platform;

generation of an information packet containing data and ID of the IoT device;

processing of the information packet with the use of the encryption key;

transmission of the information packet to the packet receiving IoT device or the cloud platform;

processing of the information packet with the use of a copy of the encryption key, wherein processing is performed in an environment of the security module of the cloud platform or the data packet receiving IoT device;

receiving processed data from the information packet in the security module of the receiving IoT device or the security module of the cloud platform; and registering retired encryption keys with assigning a new encryption key from the set of encryption keys of the IoT device and the cloud platform for confirmation of a next information packet.

19. The system according to claim 18, wherein data exchange among IoT devices and the cloud platform is performed using a protocol of wireless and/or wired data transmission.

20. The system according to claim 19, wherein the protocol is selected from the group: WLAN, WAN, Wi-Fi, GSM, GPRS, LTE, 5G, ZigBee, LPWAN, LoRaWan, Bluetooth, BLE, TCP/IP, ModBus, NB-IoT, Z-Wave, Sigfox, Ethernet.

21. The system according to claim 18, wherein the security module is adapted to update and/or supplement the set of encryption keys.

22. The system according to claim 18, wherein data exchange among IoT devices and the cloud platform is performed with the use of a blockchain protocol.

23. The system according to claim 22, wherein data exchange among IoT devices or among IoT devices and the cloud platform is performed with the use of smart-contracts.

24. The system according to claim 18, wherein encryption keys are non-recoverable from the security module.

* * * * *